United States Patent
Bönigk

(10) Patent No.: US 8,111,002 B2
(45) Date of Patent: Feb. 7, 2012

(54) DEVICE AND METHOD FOR OPERATING A HIGH-PRESSURE DISCHARGE LAMP

(75) Inventor: Michael Bönigk, Berlin (DE)

(73) Assignee: OSRAM AG, Munich (DE)

( * ) Notice: Subject to any disclaimer, the term of this patent is extended or adjusted under 35 U.S.C. 154(b) by 829 days.

(21) Appl. No.: 11/988,367

(22) PCT Filed: Jun. 30, 2006

(86) PCT No.: PCT/DE2006/001133
§ 371 (c)(1),
(2), (4) Date: Jan. 7, 2008

(87) PCT Pub. No.: WO2007/003171
PCT Pub. Date: Jan. 11, 2007

(65) Prior Publication Data
US 2009/0278468 A1    Nov. 12, 2009

(30) Foreign Application Priority Data
Jul. 6, 2005 (DE) .................. 10 2005 031 835

(51) Int. Cl.
H05B 37/02 (2006.01)
(52) U.S. Cl. .................. 315/291; 315/287; 315/307
(58) Field of Classification Search .............. 315/209 R, 315/224–225, 246–247, 287, 291, 294, 307
See application file for complete search history.

(56) References Cited

U.S. PATENT DOCUMENTS

| 5,428,268 A * | 6/1995 | Melis et al. | 315/247 |
| 5,465,029 A * | 11/1995 | Hanazaki et al. | 315/308 |
| 6,107,754 A * | 8/2000 | Kim | 315/291 |
| 6,166,495 A * | 12/2000 | Newell et al. | 315/291 |
| 6,225,754 B1 * | 5/2001 | Horiuchi et al. | 315/246 |
| 7,221,107 B2 * | 5/2007 | Melis | 315/291 |
| 7,414,373 B2 * | 8/2008 | Cho et al. | 315/307 |
| 7,504,782 B2 * | 3/2009 | Hasegawa et al. | 315/307 |
| 2002/0057062 A1* | 5/2002 | Kisaichi et al. | 315/291 |
| 2003/0062849 A1* | 4/2003 | Prasad et al. | 315/224 |
| 2004/0085027 A1* | 5/2004 | Nakagawa et al. | 315/246 |
| 2006/0055341 A1* | 3/2006 | Watanabe et al. | 315/291 |
| 2007/0164687 A1* | 7/2007 | Watanabe et al. | 315/291 |

FOREIGN PATENT DOCUMENTS

| DE | 43 01 184 | 7/1994 |
| DE | 44 10 177 | 9/1995 |
| EP | 1 176 855 | 1/2002 |
| EP | 1 458 010 | 9/2004 |
| WO | WO2004/002200 | 12/2003 |

OTHER PUBLICATIONS

Betriebsgerate und Schaltungen fur Elektrische Lampen, pp. 217-218, "Operating Device and Circuits for Elektric Lamps" C.H. Sturn et al., 6th Revised Edition 1992.

* cited by examiner

Primary Examiner — Tung X Le

(57) ABSTRACT

A device for operating a high-pressure discharge lamp (930) with a bipolar supply current and a regulated power input. The device includes a regulator (961) with an asymmetrical regulating characteristic curve for forming a current or power impulse (K1, K2) close to the zero crossing of the supply current.

11 Claims, 4 Drawing Sheets

DEVICE AND METHOD FOR OPERATING A HIGH-PRESSURE DISCHARGE LAMP

Figure 1A:
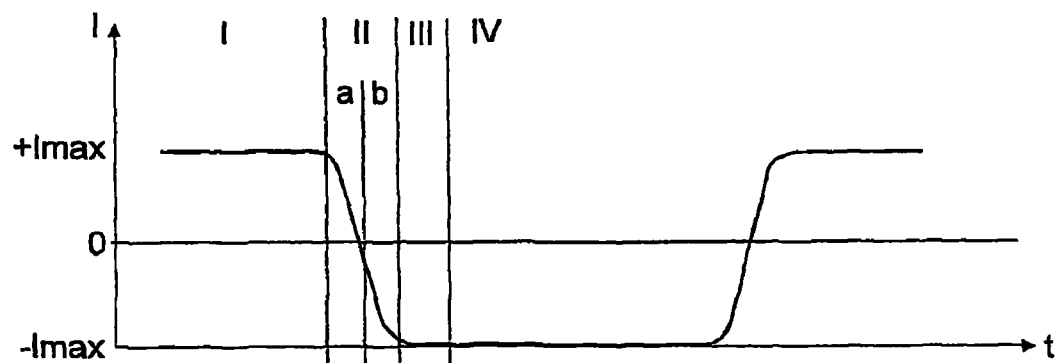

The invention relates to a device for operating a high-pressure discharge lamp as claimed in the preamble of patent claim 1 and to a corresponding operating method.

I. PRIOR ART

Such a device is described, for example, on pages 217 and 218 in the book entitled "Betriebsgeräte und Schaltungen für elektrische Lampen" [Operating devices and circuits for electric lamps] by C. H. Sturm and E. Klein, Siemens AG, 6th revised edition 1992. This passage discloses the practice of operating a high-pressure discharge lamp using a bipolar, essentially square-wave supply current with the aid of a full-bridge inverter, the high-pressure discharge lamp being connected to the bridge path of said inverter.

High-pressure discharge lamps require a defined energy balance for proper operation. If their energy balance is disrupted, changes in the operating behavior of the high-pressure discharge lamp result, for example a shortening of the lamp life on account of electrode erosion or flickering caused by an undefined discharge arc formation. When operating the high-pressure discharge lamp using a bipolar supply current, the zero crossing of the supply current at its polarity reversal represents a critical operating phase of the lamp. Particularly in the case of high-pressure discharge lamps having comparatively thick electrodes, which have a high thermal conductivity, for example in the case of mercury-free halogen metal-vapor high-pressure discharge lamps, the increased transfer of heat during the zero crossing of the supply current gives rise to correspondingly greater cooling of the lamp electrodes.

In this case, the power fed into the high-pressure discharge lamp may result in insufficient heating of the lamp electrodes prior to the polarity reversal of the supply current. Accordingly, the lamp electrodes have a reduced emission capability, and the voltage, which is available following the polarity reversal, over the entire system, that is to say over the discharge arc and the electrodes, is not sufficient to maintain the corresponding current flow or to provide it as quickly as possible. Flickering of the discharge arc may therefore be observed in the high-pressure discharge lamp. This applies, in particular, to severely aged lamps. In order to lessen this problem, according to EP 1 176 855 A2, an additional current or additional electrical power in the form of a current or power pulse is injected into the high-pressure discharge lamp close to the zero crossing of its supply current in terms of time.

II. SUMMARY OF THE INVENTION

It is the object of the invention to provide a device of the generic type and a corresponding method for operating a high-pressure discharge lamp, which makes it possible to shape the additional current or power pulse in the high-pressure discharge lamp.

According to the invention, this object is achieved by means of the features of patent claims 1 and 6. Particularly advantageous embodiments of the invention are described in the dependent patent claims.

The inventive device for operating a high-pressure discharge lamp using a bipolar supply current and power regulation comprises a regulator having an asymmetric regulating characteristic curve for shaping a current or power pulse arranged close to the zero crossing of the supply current in terms of time. The asymmetric regulator is used to generate a current or power pulse close to the zero crossing of the supply current in terms of time, preferably immediately after the zero crossing of the supply current, by the regulator immediately counteractively controlling the reduction in the supply current intensity or the power below a predefined desired value, which reduction is caused by commutation, in order to increase the supply current intensity or the power again. The regulator of the inventive device has an asymmetric regulator characteristic curve, with the result that it reacts to undershooting of the desired value of the magnitude of the supply current intensity in a more sensitive manner than to exceeding of the abovementioned desired value. In other words, the regulator is designed in such a manner that it reacts to undershooting of the abovementioned desired value with comparatively faster or greater counteractive control than in the event of this desired value being exceeded. As a result, the regulator is used to generate an excessive power increase in the form of a so-called commutation pulse immediately after each zero crossing of the bipolar supply current. The shape of this commutation pulse can be influenced by suitable dimensions of the electronic components of the regulator. The comparatively fast or great counteractive control of the regulator in the event of the abovementioned desired value being undershot gives rise to an overshoot which determines the rise and magnitude of the commutation pulse after the zero crossing of the supply current. The comparatively sluggish counteractive control of the regulator in the event of the abovementioned desired value being exceeded prevents the occurrence of oscillations upon the falling edge of the commutation pulse.

The asymmetric regulator is advantageously coupled to the power regulating device which is used to regulate the power consumption of the high-pressure discharge lamp to a constant level. As a result, the asymmetric regulator can directly intervene in the power regulation of the high-pressure discharge lamp. Alternatively, the lamp current of the high-pressure discharge lamp may also be used for regulation. The power is preferably regulated using pulse-width modulation and the asymmetric regulator is therefore preferably coupled to a pulse-width modulation controller for regulating the power of the high-pressure discharge lamp.

According to the preferred exemplary embodiment of the invention, the device comprises a half-bridge or full-bridge inverter, the high-pressure discharge lamp being connected to the bridge path of said inverter in order to supply said lamp with a low-frequency bipolar current of usually less than 1000 hertz.

The regulator is preferably in the form of either an asymmetric proportional-integral regulator (PI regulator) or an asymmetric integral regulator (I regulator).

III. DESCRIPTION OF THE PREFERRED EXEMPLARY EMBODIMENTS

Figure 1B:
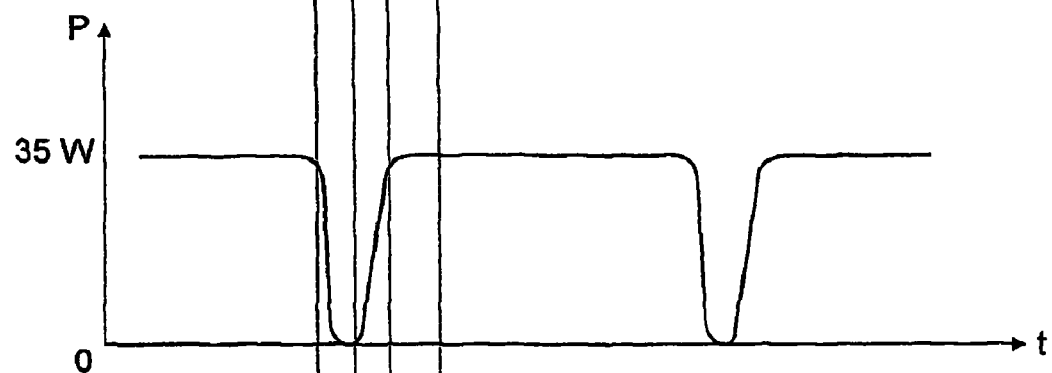
Figure 2:
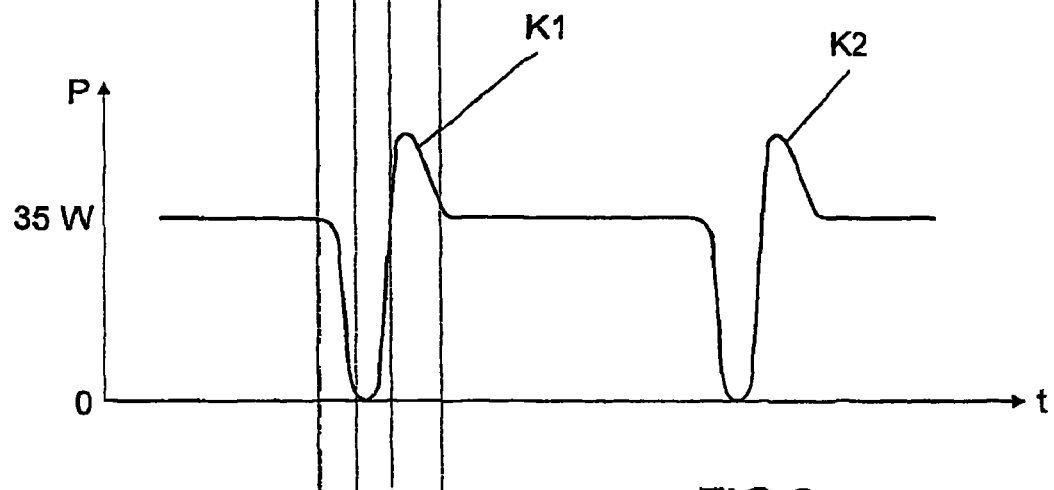
Figure 3:
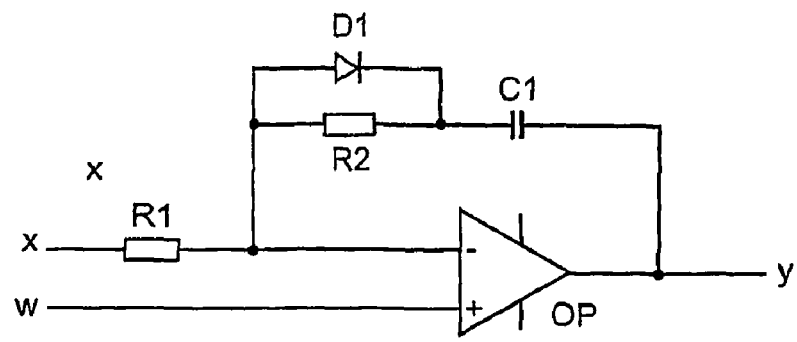
Figure 4:
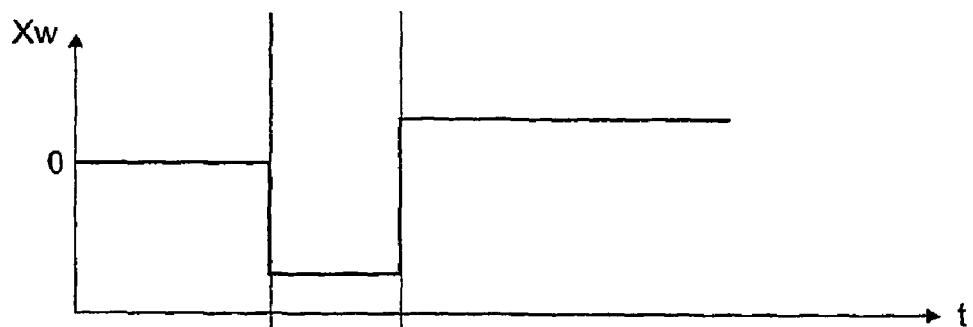
Figure 5:
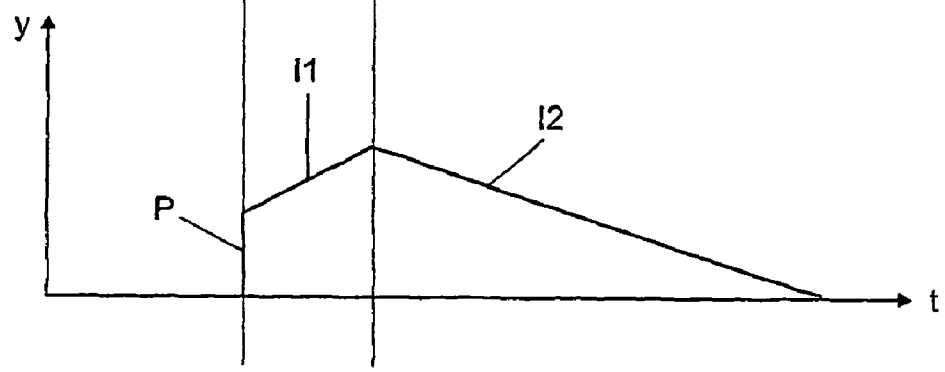
Figure 6:
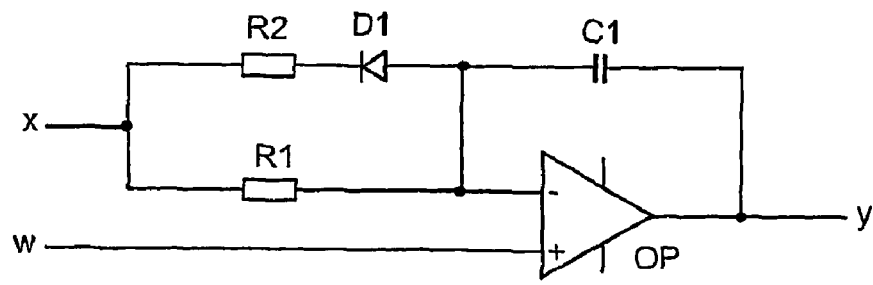
Figure 7:
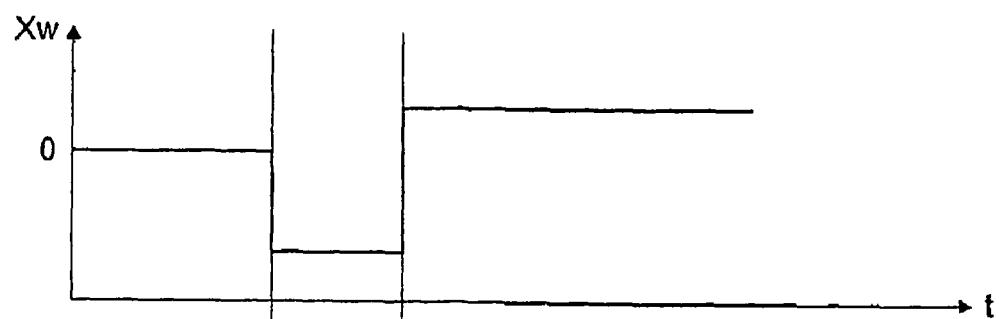
Figure 8:
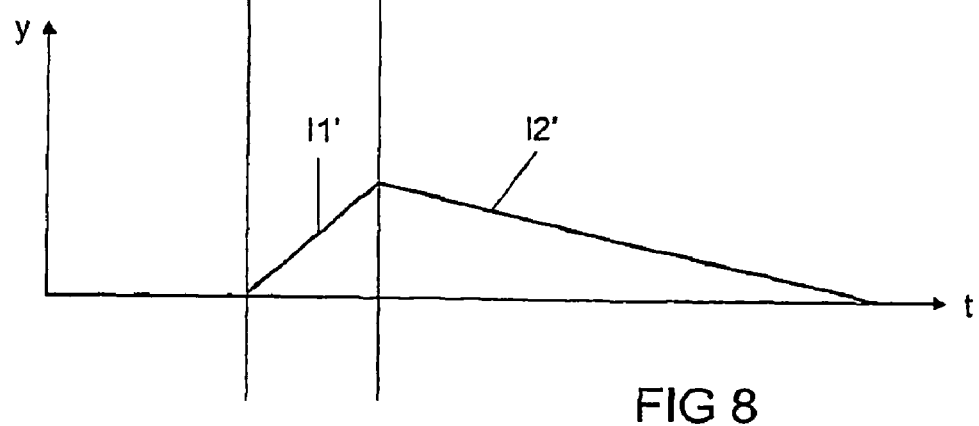
Figure 9:
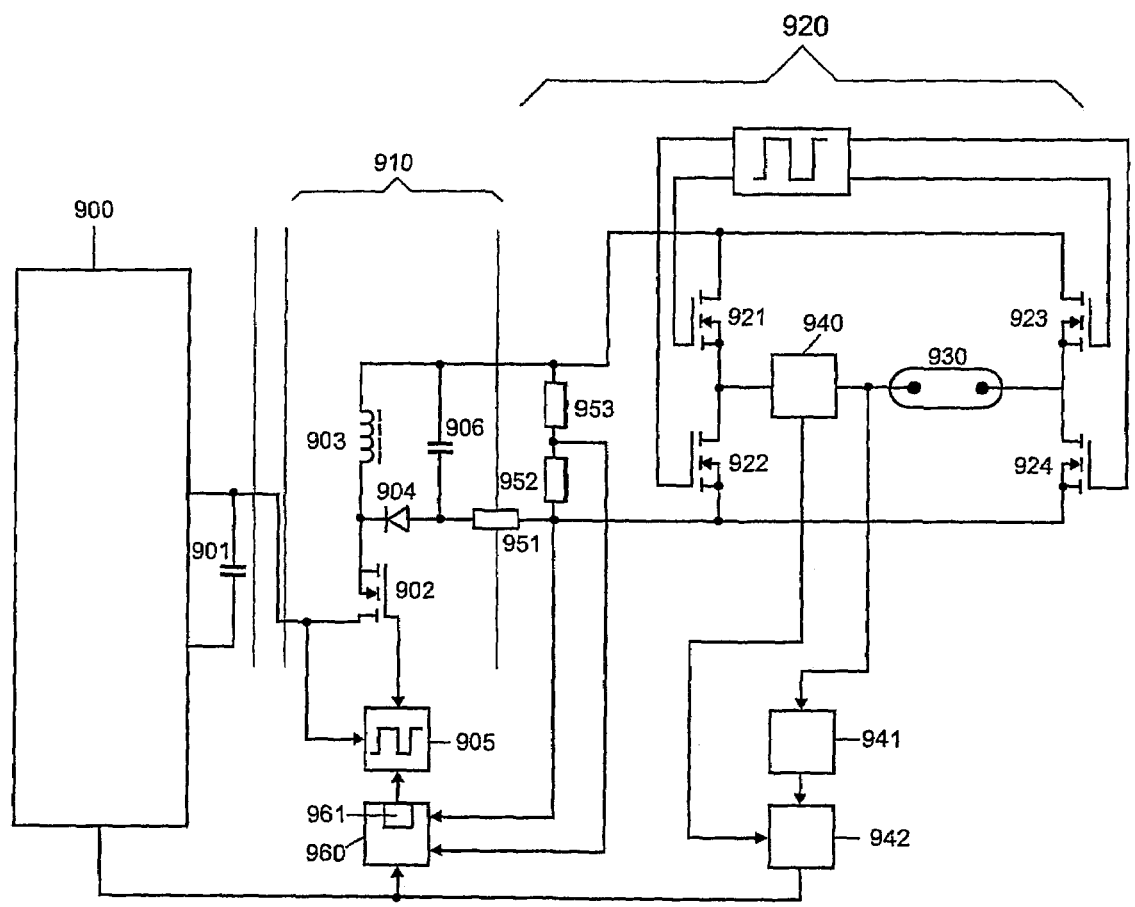

The invention is explained in more detail below using preferred exemplary embodiments. In the drawing:

FIG. 1 *a*) shows a schematic illustration of the temporal profile of the supply current for the high-pressure discharge lamp without regulation using the asymmetric regulator, FIG. 1 *b*) shows a schematic illustration of the temporal profile of the power consumption of the high-pressure discharge lamp without regulation using the asymmetric regulator, FIG. 2 shows a schematic illustration of the temporal profile of the instantaneous power consumption of the high-pressure discharge lamp with commutation pulses, which are shaped by the asymmetric regulator, immediately after each zero crossing of the supply current, FIG. 3 shows a sketched circuit of an asymmetric regulator according to the first exemplary embodiment of the invention, FIG. 4 shows a schematic illustration of the temporal profile of a regulating deviation, FIG. 5 shows a schematic illustration of the response of the regulator according to FIG. 3 to the regulating deviation according to FIG. 4, FIG. 6 shows a sketched circuit of an asymmetric regulator according to the second exemplary embodiment of the invention, FIG. 7 shows a schematic illustration of the temporal profile of a regulating deviation, FIG. 8 shows a schematic illustration of the response of the regulator according to FIG. 6 to the regulating deviation according to FIG. 7, FIG. 9 shows a sketched circuit of the circuit arrangement for operating a high-pressure discharge lamp according to the preferred exemplary embodiment of the invention.

FIG. 9 schematically illustrates the structure of a circuit arrangement for operating a high-pressure discharge lamp according to the preferred exemplary embodiments of the inventive device. The circuit arrangement comprises a voltage converter 900, to the DC voltage output of which a storage capacitor 901 is connected. The storage capacitor 901 is used as a DC voltage source for a step-down converter 910 which is connected to it and comprises the transistor 902, the inductance 903, the diode 904 and the pulse-width modulation controller 905 for the transistor 902, and the capacitor 906. The DC output voltage of the step-down converter 910 is provided at the capacitor 906. The capacitor 906 is used as a voltage source for the full-bridge inverter 920 which is connected to it and is essentially formed by the transistors 921, 922, 923 and 924. The high-pressure discharge lamp 930 and the ignition device 940 for the high-pressure discharge lamp 930 as well as the ignition monitoring circuit 941 with the ignition timer 942 are connected to the bridge path of the full-bridge inverter 920. The resistors 951, 952, 953 are used to determine the instantaneous power consumption of the high-pressure discharge lamp 930. The measurement signals from the resistors 951, 952, 953 are supplied to the power regulating unit 960 which generates, at its output, a control signal for the pulse-width modulation controller 905 for the transistor 902. The power regulating unit 960 comprises a regulator 961 with an asymmetric regulating characteristic curve. FIGS. 3 and 6 schematically illustrate two different exemplary embodiments of the regulator 961. However, the regulator 961 may also be implemented, in the form of software, in a program-controlled microcontroller for regulating the power of the high-pressure discharge lamp. The power of the high-pressure discharge lamp 930 is regulated using the power regulating unit 960, the regulator 961 and the pulse-width modulation controller 905 by changing the switched-on and switched-off duration of the transistor 902 of the step-down converter 910. The switching frequency of the transistor 902 and accordingly also the pulse-width modulation signals generated by the pulse-width modulation controller 905 are at a frequency above 20 kHz.

According to the preferred exemplary embodiments, the high-pressure discharge lamp 930 is a halogen metal-vapor high-pressure discharge lamp having a nominal power of 35 watts, which is provided as a light source for a motor vehicle headlamp. The circuit arrangement depicted in FIG. 9 is therefore fed by the motor vehicle power supply system voltage.

The transistor pairs 921, 924 and 922, 923 of the full-bridge inverter 920 alternately switch at a frequency of 500 hertz, with the result that the high-pressure discharge lamp 930 is fed with an essentially square-wave, bipolar supply current at the same frequency. FIG. 1a schematically illustrates the temporal profile of an essentially square-wave, bipolar supply current using a half-cycle. FIG. 1b shows the temporal profile of the power consumption of the high-pressure discharge lamp 930, which corresponds to the current profile illustrated in FIG. 1a. Such a current or power profile is prior art. The asymmetric regulator which, according to the invention, is part of the operating device is used to generate current pulses in the time intervals III, which current pulses are superimposed on the essentially square-wave, bipolar supply current and occur immediately after each zero crossing of the supply current. These current pulses are in phase with power pulses K1, K2 which occur in the same time intervals and correspond to the current pulses. Therefore, FIG. 2 illustrates only the temporal profile of the instantaneous electrical power consumption of the high-pressure discharge lamp 930, which is generated using the inventive device. The current pulses corresponding to the power pulses K1, K2 alternately have a negative polarity and a positive polarity and their maximum current intensity is greater than the amplitude Imax of the square-wave supply current. The current pulses and power pulses (illustrated in FIG. 2) are also referred to as commutation pulses K1, K2. The regulator is in the steady state in the time intervals I and IV before and after the zero crossings of the supply current. The high-pressure discharge lamp 930 is operated close to its nominal power of 35 watts during the time intervals I and IV. The pulse power of the commutation pulses K1, K2 and the power consumption during the phases I and IV produce a value of 35 watts, averaged over the entire period of the lamp current.

The commutation pulses K1, K2 during the time intervals III are generated and shaped with the aid of the asymmetric regulator 961 which is part of the power regulating unit 960 which is used to regulate the power consumption of the high-pressure discharge lamp 930. The regulator 961 operates with two different regulator characteristic curves, the first regulator characteristic curve being effective only in the case of a negative regulating deviation Xw, that is to say when the desired value of the power consumption of 35 watts is undershot, and the second regulator characteristic curve being effective only in the case of a positive regulating deviation Xw, that is to say when the desired value of the power consumption of 35 watts is exceeded. The counteractive control of the regulator 961 using the second regulator characteristic curve is slower or more sluggish than its counteractive control using the first regulator characteristic curve. Therefore, the regulator 961 reacts to exceeding of the desired power value of 35 watts with weaker counteractive control than to undershooting of the abovementioned desired power value. It is thus asymmetric. The first regulator characteristic curve of the regulator 961 is effective during the time intervals IIa, IIb (FIGS. 1 and 2) and the second regulator characteristic curve is effective during the time intervals III.

If the supply current falls at the beginning of the time intervals IIa when the full-bridge 920 is off, with the result that the instantaneous power consumption of the high-pressure discharge lamp 930 falls below the desired value of 35 watts, the asymmetric regulator 961 is used to carry out immediate counteractive control. The regulator 961 operates as a proportional-integral regulator (PI regulator) or an integral regulator (I regulator) with its first characteristic curve. Since the clocked power supply 910, 920 of the high-pressure discharge lamp 930 operates for a load toward zero (that is to say its resistance value tends toward infinity) during the time intervals IIa on account of the fact that the full-bridge 920 is off, the voltage across the capacitor 906 increases because the energy stored in the inductance 903 discharges into the capacitor 906 during the time intervals IIa. This excessive voltage is available as a driving voltage during the time intervals IIb in order to effect a steep rise in the current intensity of the supply current at the beginning of its negative half-cycle and to shorten the commutation time of the supply current as well as to effect a steep rise in the power consumption (FIG. 2). This results, in conjunction with the first regulator characteristic curve of the regulator 961 which acts during the time intervals IIb and the second regulator characteristic curve of the regulator 961 which acts during the time intervals III, in a severe overshoot of the power consumption and thus in the production of the power pulses K1, K2 during the time intervals III. If the high-pressure discharge lamp 930 is an old lamp which forms comparatively long current-free phases during commutation, that is to say during the zero crossing of the supply current, the above effect is intensified. The regulator 961 attempts to use rapid counteractive control in accordance with its first regulator characteristic curve to increase the power consumption of the lamp further. This results in a further increase in the driving voltage across the capacitor 906 and in a more severe overshoot and in higher commutation pulses K1, K2.

FIG. 3 schematically depicts a circuit arrangement of the asymmetric regulator 961 according to the first exemplary embodiment. The regulator comprises an operational amplifier OP, two resistors R1, R2, a diode D1 and a capacitor C1. The regulating variable x is supplied to the inverting input of the operational amplifier OP via the resistor R1. The desired value w is supplied to the non-inverting input of the operational amplifier OP. The output y of the operational amplifier OP is fed back to the inverting input of the operational amplifier via the capacitor C1 and the parallel circuit which is connected in series with the capacitor C1 and comprises the diode D1 and the resistor R2. This regulator is in the form of an asymmetric proportional-integral regulator (PI regulator). FIG. 5 schematically illustrates the response of this regulator to the regulating deviation Xw according to FIG. 4 which is predefined as an example. The regulating deviation Xw is calculated as the difference between the regulating variable x and the desired value w.

In the case of a negative regulating deviation Xw, the regulator generates a portion P (FIG. 5) of the manipulated variable y, which is proportional to the regulating deviation Xw, and a first integral portion I1 of the manipulated variable y. This case corresponds to the abovementioned first regulating characteristic curve of the regulator 961. In the case of a positive regulating deviation Xw, the regulator generates a second integral portion I2 of the manipulated variable y. This case corresponds to the abovementioned second regulating characteristic curve of the regulator 961. Depending on the sign of the regulating deviation Xw, the diode D1 is operated in the forward or reverse direction and another time constant for the RC element in the feedback path between the output y and the inverting input of the operational amplifier OP and thus another regulating characteristic curve as well are correspondingly effective.

FIG. 6 schematically depicts a circuit arrangement of the asymmetric regulator 961 according to the second exemplary embodiment. The regulator comprises an operational amplifier OP, two resistors R1, R2, a diode D1 and a capacitor C1. The regulating variable x is supplied to the inverting input of the operational amplifier OP via the parallel circuit comprising the resistor R1 and the series circuit of the resistor R2 and the diode D1. The desired value w is supplied to the non-inverting input of the operational amplifier OP. The output y of the operational amplifier OP is fed back to the inverting input of the operational amplifier via the capacitor C1. This regulator is in the form of an asymmetric integral regulator (I regulator). FIG. 8 schematically illustrates the response of this regulator to the regulating deviation Xw according to FIG. 7 which is predefined as an example. The regulating deviation Xw is calculated as the difference between the regulating variable x and the desired value w.

In the case of a negative regulating deviation Xw, the regulator generates a first integral portion I1' of the manipulated variable y. This case corresponds to the abovementioned first regulating characteristic curve of the regulator 961. In the case of a positive regulating deviation Xw, the regulator generates a second integral portion I2' of the manipulated variable y. This case corresponds to the abovementioned second regulating characteristic curve of the regulator 961. Depending on the sign of the regulating deviation Xw, the diode D1 is operated in the forward or reverse direction and either the parallel circuit comprising the resistors R1, R2 or only the resistor R1 is accordingly to be used to calculate the time constant of the RC element in the feedback path between the output y and the inverting input of the operational amplifier OP and two different regulating characteristic curves, which are effective depending on the sign of the regulating deviation Xw, thus also result for the regulator.

The invention is not restricted to the exemplary embodiments explained in more detail. For example, the asymmetric regulator can also be implemented using a microcontroller or microprocessor with implemented software, without using analog components.

The invention claimed is:

1. A method for operating a high-pressure discharge lamp using a bipolar supply current and a regulation of the power consumption, in which current or power pulses are shaped close to the zero crossings of the supply current in terms of time, wherein the power consumption is regulated with the aid of an asymmetric regulating characteristic curve, with the result that an undershooting of a predetermined desired value of the magnitude of the supply current intensity is reacted to with a comparatively faster or greater counteractive control than in the case of an exceeding of this desired value.

2. A device for operating a high-pressure discharge lamp using a bipolar supply current and a regulated power consumption, the device comprising a regulator having an asymmetric regulates characteristic curve for shaping a current or power pulse arranged close to the zero crossing of the supply current in terms of time, wherein the regulator shapes a current or power pulse arranged close to the zero crossing in terms of time through application of an asymmetric regulating characteristic curve, with the result that the regulator reacts to an undershooting of a predetermined desired value of the magnitude of the supply current intensity with a comparatively faster or greater counteractive control than in the case of an exceeding of this desired value.

3. A device for operating a high-pressure discharge lamp using a bipolar supply current and a regulated power consumption, the device comprising an asymmetric regulator comprising:
   a first regulator characteristic comprising a first counteractive control rate being effective when the magnitude of the actual power consumed by the discharge lamp negatively deviates from a desired power consumption; and,
   a second regulator characteristic comprising a second counteractive control rate different from the first counteractive control rate, the second counteractive control rate being effective when the magnitude of the actual power consumed by the discharge lamp positively deviates from said desired power consumption.

4. A device according to claim 3, wherein said second counteractive control rate is slower than said first counteractive control rate.

5. A device according to claim 4, wherein
in response to a negative deviation by the actual power consumption from the desired power consumption, the asymmetric regulator generates at least one commutation pulse to the high-pressure discharge lamp superimposed on the bipolar supply current, the magnitude of said commutation pulse influenced by said first counteractive control rate.

6. A device according to claim 5, wherein the magnitude of said commutation pulse is influenced by said second counteractive control rate.

7. A device according to claim 5, wherein said at least one commutation pulse is configured such that the actual power consumption overshoots said desired power consumption.

8. A device according to claim 7, wherein said overshooting of the actual power consumption triggers the asymmetric regulator according to the second regulator characteristic to return the actual power consumption to the desired power consumption according to the second counteractive control rate.

9. A device according to claim 5, wherein the negative deviation is due to a zero crossing of the supply current.

10. A device according to claim 5, wherein the average power supplied to the discharge lamp during one cycle of the bipolar supply current is equal to the desired power consumption.

11. The device according to claim 3, wherein the asymmetric regulator is implemented using a microprocessor with implemented software.

* * * * *